United States Patent [19]
Wengrovius et al.

[11] Patent Number: 5,175,057
[45] Date of Patent: Dec. 29, 1992

[54] ADHESION PROMOTERS FOR ROOM TEMPERATURE VULCANIZABLE SILICONE COMPOSITIONS

[75] Inventors: Jeffrey H. Wengrovius; Gary M. Lucas, both of Scotia, N.Y.

[73] Assignee: General Electric Company, Waterford, N.Y.

[21] Appl. No.: 720,554

[22] Filed: Jun. 25, 1991

[51] Int. Cl.$^5$ .................... B32B 9/04; C08G 77/06
[52] U.S. Cl. ............................. 428/447; 525/477; 528/18; 528/33; 528/34
[58] Field of Search .............. 525/477; 528/18, 33, 528/34; 428/447

[56] References Cited

U.S. PATENT DOCUMENTS

| | | | |
|---|---|---|---|
| 2,676,182 | 4/1954 | Daudt et al. | 260/448.2 |
| 4,483,973 | 11/1984 | Lucas et al. | 528/21 |
| 4,515,932 | 5/1985 | Chung | 528/16 |
| 4,554,331 | 11/1985 | Fey et al. | 525/477 |
| 4,593,085 | 6/1986 | Lucas | 528/18 |
| 4,670,532 | 6/1987 | Lucas | 528/18 |
| 4,755,578 | 7/1988 | Lucas | 528/17 |
| 4,780,338 | 10/1988 | Saad et al. | 427/387 |
| 4,797,445 | 1/1989 | Piskoti | 524/588 |
| 4,826,915 | 5/1989 | Stein et al. | 524/731 |
| 4,863,992 | 9/1989 | Wengrovius et al. | 524/731 |
| 4,895,918 | 1/1990 | Lucas | 528/18 |
| 5,008,349 | 4/1991 | Kosal et al. | 525/477 |

OTHER PUBLICATIONS

Noll, *Chemistry and Technology of Silicones*; Academic Press, 1968. pp. 282–287.

*Primary Examiner*—Melvyn I. Marquis
*Assistant Examiner*—Margaret W. Glass

[57] ABSTRACT

Alkoxy-functional RTV silicone compositions are provided containing improved adhesion promoters which are the reaction product of a silanol-containing polysiloxane fluid preferably comprising (i) monoorganosiloxy; (ii) triorganosiloxy units; (iii) diorganosiloxy units; and, optionally, (iv) siloxy units; and B) an organofunctional-polyalkoxysilane containing polar organic groups.

17 Claims, No Drawings

ADHESION PROMOTERS FOR ROOM TEMPERATURE VULCANIZABLE SILICONE COMPOSITIONS

BACKGROUND OF THE INVENTION

This invention relates to adhesion promoters. More particularly, this invention relates to improved adhesion promoters suitable for use in room temperature vulcanizable silicone compositions.

One component room temperature vulcanizable (RTV) silicone rubber compositions are frequently used as protective coatings and as encapsulation coatings. Such applications require that the bond between the RTV silicone composition and substrate on which it is coated be as strong as possible.

During the course of development of one component RTV silicone rubber compositions, it became desirable for such compositions to contain self-bonding additives, i.e., adhesion promoters, which would allow the RTV composition to bond without a primer to various types of substrates with good adherency. Such adhesion promoters are disclosed, for example, in U.S. Pat. No. 4,483,973 (Lucas et al.) and 4,863,992 (Wengrovius et al.).

U.S. Pat. No. 4,483,973 to Lucas et al. (Lucas '973) discloses a one component RTV silicone rubber composition containing an adhesion promoter which is a silane functionalized by radicals selected from amino, ether, epoxy, isocyanato, cyano, acryloxy, and acyloxy. U.S. Pat. No. 4,863,992 to Wengrovius et al. (Wengrovius) discloses a one component RTV silicone rubber composition containing an adhesion promoter which is selected from the group consisting of N-trialkoxysilylalkyl-substituted amides and imides, N-mono(trialkoxysilylalkyl)-substituted ureas, N,N'-bis(trialkoxysilylalkyl)-substituted ureas, trialkoxysilylalkyl isocyanurates and mono-(N-trialkoxysilylalkyl)alkylenediamines.

The present invention is based on the discovery that an adhesion promoter which provides better adhesion than those disclosed in the Lucas '973 and Wengrovius patents discussed above can be obtained by reacting certain of the adhesion promoters disclosed in those patents with certain silanol fluids, the resulting reaction product then being used as the adhesion promoter in the RTV silicone composition.

RTV compositions containing the polysiloxane adhesion promoters disclosed in the Lucas '973 and Wengrovius patents referenced above and silanol fluids which can be used in the present invention are disclosed, for example, in copending, commonly assigned application Ser. No. 07/628,776 (Lucas), filed on Dec. 17, 1990; and U.S. Pat. Nos. 4,593,085; 4,895,918, both to Lucas. However, these references do not teach the use of the reaction product of the polysiloxane adhesion promoting compound and the silanol fluid as the adhesion promoter and do not suggest that such a reaction product will be a superior adhesion promoter to the polysiloxane adhesion promoters taught in those references as well as in U.S. Pat. No. 4,483,973 to Lucas et al.

SUMMARY OF THE INVENTION

The present invention provides an alkoxy-functional RTV organopoly-siloxane composition comprising by weight: (1) 100 parts of a polyalkoxy-terminated polydiorganosiloxane having a viscosity of from about 100 to about 1,000,000 centipoise at 25° C., wherein the silicon atoms at each polymer chain end is terminated with at least two alkoxy radicals, the organic group being a $C_{1-15}$ monovalent hydrocarbon radical;

(2) an effective amount of a diorganotin bis beta-diketonate condensation catalyst of the general formula:

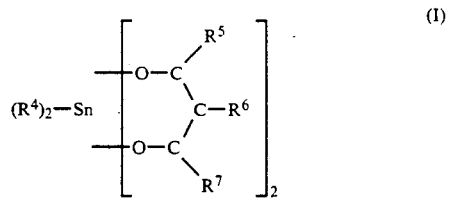

(I)

wherein $R^4$ is selected from $C_{(1-18)}$ monovalent hydrocarbon radicals and substituted monovalent hydrocarbon radicals, and $R^5$, $R^6$, and $R^7$ are the same or different monovalent radicals selected from the class consisting of hydrogen, $R^4$, $OR^4$, $-Si(R^4)_3$, $-OSi(R^4)_3$, aryl, acyl, and nitrile; and (3) from about 1.0 to about 50 parts of an adhesion promoter which is the product prepared by reacting at a temperature in the range of from about 10° to about 150° C.:

(A) 100 parts by weight of a silanol-containing polysiloxane selected from
  (i) a linear, silanol-terminated polydiorganosiloxane having the general formula:

$HO(R_2SiO)_nH$ (II)

wherein each R is independently a monovalent hydrocarbon radical having from 1 to about 10 carbon atoms, and "n" is a whole number that varies from about 2 to about 1000; or
  (ii) a silanol-containing polysiloxane fluid comprising:
    (a) from about 1 to about 80 mole percent of monoorganosiloxy units;
    (b) from about 0.5 to about 50 mole percent of triorganosiloxy units;
    (c) from about 1 to about 80 mole percent of diorganosiloxy units; and
    (d) from 0 to about 25 mole percent of siloxy units; the silanol-containing polysiloxane containing from about 0.01% to about 7% by weight of silicon-bonded hydroxyl groups; and (B) from about 0.1 to about 10 parts by weight of at least one organofunctional-polyalkoxysilane having the general formula

$$X-R^2-Si-(OR^1)_{3-a}$$
$$R_a^3$$

(III)

wherein each $R^1$ and $R^3$ is independently a monovalent hydrocarbon radical having from 1 to about 20 carbon atoms; each $R^2$ is independently a divalent saturated, unsaturated, or aromatic hydrocarbon radical having from 1 to about 20 carbon atoms; X is a polar organic radical selected from the group consisting of amido, formamido, imidato, urea, isocyanato, cyano, acryloxy, acyloxy, ether, and epoxy, and "a" is a number from 0 to 2.

The alkoxy-functional room temperature vulcanizable organopolysiloxane compositions of this invention have improved adhesion to various substrates as a result of the particular adhesion promoter used therein.

DETAILED DESCRIPTION OF THE INVENTION

The adhesion promoter of this invention is the reaction product of a (A) silanol-containing polysiloxane and (B) an organofunctional-polyalkoxysilane.

The silanol-containing polysiloxane fluid (A) can be (i) a linear, silanol-terminated polydiorganopolysiloxane of formula (I) above or (ii) a silanol-containing polysiloxane fluid comprising monoorganosiloxy, siloxy, triorganosiloxy, and diorganosiloxy units, as described in more detail hereinbelow.

The linear, silanol-terminated polydiorganosiloxane of alternative (A) (i) has the general formula:

$$HO(R_2SiO)_nH \quad (II)$$

wherein each R is independently a monovalent hydrocarbon radical having from 1 to about 10 carbon atoms, and "n" is a whole number that varies from about 2 to about 1000, preferably from about 4 to about 50, and most preferably from about 4 to about 10. Preferably, "n" varies such that the viscosity of the polymer of formula (I) varies from about 10 to about 10,000, preferably from about 25 to about 1000, and most preferably from about 50 to about 500, centipoise at 25° C.

The linear silanol of alternative (A) (i) can be prepared by various methods known in the art, for example, those methods taught in Lampe, U.S. Pat. No. 3,888,815 and Peterson, U.S. Pat. No. 4,250,290, which are both herein incorporated by reference.

For purposes of the present invention, the most preferred embodiment of the silanol-containing polysiloxane (A) is alternative (A) (ii), the silanol-containing polysiloxane fluid comprising monoorganosiloxy, siloxy, triorganosiloxy, and diorganosiloxy units. For purposes of brevity, the fluid of (A) (ii) will hereinafter sometimes be referred to as the "MDT" fluid.

MDT fluids useful as (A) (ii) herein and methods for preparing them are known in the art and such fluids are disclosed, for example, in U.S. Pat. Nos. 4,513,115 (Beers), 4,483,973 (Lucas et al.), and 4,895,918 (Lucas), which are hereby incorporated by reference herein. These fluids can be prepared by preparing a mixture of (i) monoorganotrifluorosilane; (ii) diorganodichlorosilane; and (iii) organotrichlorosilane, silicon tetrachloride or a mixture thereof, at the appropriate mole ratio, and running the mixture into toluene and water to cohydrolyze them. The mixture can then be heated, e.g., at about 60° C., for a time sufficient to insure completion of the reaction. The oil phase is separated and neutralized, e.g., by washing with an aqueous solution of sodium carbonate or bicarbonate. After filtration to remove insolubles and devolatilization, e.g., by heating at about 140° C. under a vacuum, e.g., about 2 mm of mercury, the MDT fluid remains as the residue.

From an economic standpoint, it is preferred to keep the silicon-bonded hydroxyl content to less than 10% by weight to minimize the viscosity of the final composition and to keep the crosslinker level to a minimum. This is done by heating the product at 110° C. in the presence of approximately 1% of sodium carbonate. The water from the silanol condensation can conveniently be removed by axeotropic distillation, e.g., with toluene. After removal of the toluene by distillation, the product is filtered before use.

The MDT fluid of (A) (ii) will preferably have a viscosity in the range of from about 10 to about 10,000; preferably from about 25 to about 1000, and most preferably from about 50 to about 500, centipoise at 25° C.

The MDT fluid of (A) (ii) comprises by weight:

(i) from about 1 to about 80, preferably from about 10 to about 70, and most preferably from about 20 to about 60, mole percent of monoorganosiloxy units;

(ii) from about 0.5 to about 50, preferably from about 5 to about 40, and most preferably from about 10 to about 30, mole percent of triorganosiloxy units;

(iii) from about 1 to about 80, preferably from about 10 to about 70, and most preferably from about 20 to about 60, mole percent of diorganosiloxy units; and (iv) from 0 to about 25, preferably from 0 to about 5, and most preferably 0, mole percent of siloxy units.

The organo groups of the MDT fluid of (A) (ii) are monovalent hydrocarbon radicals having from 1 to about 10 carbon atoms. Most preferably, these monovalent hydrocarbon radicals are alkyl radicals of 1 to about 5, and preferably from about 1 to about 3 carbon atoms, and most preferably are methyl radicals.

The silanol-containing polysiloxane (A) contains from about 0.01 to about 7, preferably from about 0.05 to about 5, and most preferably from about 1 to about 4, % by weight of silicon-bonded hydroxyl groups.

The organofunctional-polyalkoxysilane (B) has the general formula

$$X-R^2-\underset{\underset{R_a^3}{|}}{Si}-(OR^1)_{3-a} \quad (III)$$

wherein each $R^1$ and $R^3$ is independently a monovalent hydrocarbon radical having from 1 to about 20, preferably from about 1 to about 10, and most preferably from about 1 to about 4 carbon atoms; each $R^2$ is independently a divalent saturated, unsaturated, or aromatic hydrocarbon radical having from 1 to about 20, preferably from about 1 to about 15, and most preferably from about 1 to about 10 carbon atoms; X is a polar organic radical selected from the group consisting of amido, formamido, imidato, ureas, isocyanato, cyano, acryloxy, acyloxy, ether, and epoxy, and "a" is a number from 0 to 2, and is preferably 0.

Organofunctional-polyalkoxysilanes having formula (III) are known in the art and are disclosed for example in U.S. Pat. Nos. 3,888,815; 4,472,590; 4,483,973; and 4,826,915; all of which are hereby incorporated by reference herein.

Examples of $R^1$ and $R^3$ include alkyl radicals, e.g., methyl, ethyl, propyl, and the like; alkenyl radicals, e.g., vinyl, allyl, and the like; cycloalkyl radicals, e.g., cyclohexyl, cycloheptyl, and the like; mononuclear aryl radicals, e.g., methyl-phenyl, and the like; and fluoroalkyl radicals, e.g., 3,3,3-trifluoropropyl radicals. Most preferably, $R^1$ and $R^3$ are each methyl or ethyl.

$R^2$ in formula (III) is preferably an alkylene radical of from 1 to about 20 and preferably from about 1 to about 10, carbon atoms, or an arylene radical, preferably phenylene. Most preferably, $R^2$ is ethylene or propylene.

X is a polar organic radical selected from the group consisting of amido, formamido, imidato, ureas, isocyanato, cyano, acryloxy, acyloxy, ether, and epoxy. X does not represent an amino radical, however, because amino radicals tend to react with the tin condensation catalyst used in this invention and such reactions may destabilize the final RTV composition.

Examples of compounds within the scope of formula (III) above include N-trialkoxysilylalkyl-substituted amides, N-trialkoxysilylalkylformamides, N-trialkoxysilylalkyl-substituted imides, N-mono(trialkoxysilylalkyl)-substituted ureas, N,N'-bis(trialkoxysilylalkyl)-substituted ureas, trialkoxysilylalkyl isocyanurates, and trialkoxysilylalkyl epoxides.

The most preferred organo-functional polyalkoxysilane compounds for use in this invention are the polyalkoxysilylalkyl isocyanurates and the polyalkoxysilylalkyl epoxides. The most preferred of these compounds are the trialkoxysilylalkyl isocyanurates and the trialkoxysilylalkyl epoxides.

Specific examples of polyalkoxysilylalkyl isocyanurates useful for use herein include 1,3,5-tris(methyldimethoxysilylpropyl)isocyanurate; 1,3,5-tris(methyldiethoxysilylpropyl)isocyanurate; 1,3,5-tris(trimethoxysilylpropyl)isocyanurate and 1,3,5-tris(trimethoxysilylethyl)isocyanurate. The most preferred of these is 1,3,5-tris(trimethoxysilylpropyl)isocyanurate.

Specific examples of polyalkoxysilylalkyl epoxides useful for use herein include gamma-glycidoxypropylmethyldimethoxysilane; gamma-glycidoxypropylmethyldiethoxysilane; gamma-glycidoxypropyltriethoxysilane and gamma-glycidoxypropyltrimethoxysilane. The most preferred of these is gamma-glycidoxypropyltrimethoxysilane.

The preferred organo-functional polyalkoxysilane for use in this invention is 1,3,5-tris(trimethoxysilylpropyl)isocyanurate, gamma-glycidoxypropyltrimethoxysilane, or a combination of the foregoing, with the most preferred organo-functional polyalkoxysilane varying according to the substrate used in connection with the RTV composition of this invention. For example, with a concrete substrate, a combination of 1,3,5-tris(trimethoxysilylpropyl)isocyanurate and gamma-glycidoxypropyl-trimethoxysilane is most preferred. The best organo-functional polyalkoxysilane for use with a particular substrate can be determined by one skilled in the art without undue experimentation.

Specific examples of other suitable organo-functional trialkoxysilanes for use in this invention include N-(3-triethoxysilylpropyl)urea; N,N'-bis(3-trimethoxysilylpropyl)urea; N-(3-triethoxysilylpropyl)-p-nitrobenzamide; and tris(3-trimethoxysilylpropyl)maleimide.

The organo-functional trialkoxysilanes (B) and methods for making them are disclosed, for example, in U.S. Pat. Nos. 4,863,992 (Wengrovius et al.); 4,483,973 (Lucas et al.), 3,888,815; and 4,472,590, each of which is incorporated by reference herein.

For example, polyalkoxysilylalkylisocyanurate compounds such as 1,3,5-tris(trimethoxysilylpropyl)isocyanurate can be prepared by taking the corresponding alkoxy hydride silane and reacting it with the unsaturated isocyanurate or cyanurate in the presence of a platinum catalyst whereupon the hydride adds on to the unsaturated group such as the allyl group of the isocyanurate nucleus.

In an example of a method for making the epoxy-functional polyalkoxysilane compounds such as gamma-glycidoxypropyltrimethoxysilane, an allyl glycidyl ether is reacted with trimethoxyhydridesilane in the presence of a platinum catalyst.

The adhesion promoter of this invention is prepared by reacting at a temperature of from about 10 to about 150, preferably from about 80 to about 130, and most preferably from about 90° to about 110° C., 100 parts by weight of (A) with from about 5 to about 20, preferably from about 7 to about 15, and most preferably from about 9 to about 11, parts by weight of (B). The reaction is carried out for a suitable period of time, typically about 0.5-3.0 hours, preferably with agitation. The use of diluents is within the scope of this invention but is seldom necessary or preferred.

The reaction between (A) and (B) does not require a catalyst. However, a condensation catalyst can be used, if desired. The preferred condensation catalysts for use herein are the acidic amine salts, e.g, amine salts of formic acid, disclosed in U.S. Pat. No. 4,863,992 (Wengrovius et al.), which is hereby incorporated by reference herein.

The amount of condensation catalyst which can be used in the reaction between (A) and (B) may vary from about 0.01 to about 1, preferably from about 0.05 to about 0.5, and most preferably from about 0.08 to about 0.15, parts by weight, per 100 parts of (A).

The adhesion promoter of this invention is suitable for use in alkoxy-functional RTV silicone compositions, such as those taught in U.S. Pat. No. 4,863,992 (Wengrovius).

Thus, the present invention provides an alkoxy-functional RTV organopolysiloxane composition comprising by weight:

(1) 100 parts of a polyalkoxy-terminated polydiorganosiloxane having a viscosity of from about 100 to about 1,000,000 centipoise at 25° C., wherein the silicon atoms at each polymer chain end is terminated with at least two alkoxy radicals, the organic group being a $C_{1-15}$ monovalent hydrocarbon radical;

(2) an effective amount of a diorganotin bis beta-diketonate condensation catalyst of the general formula (I) previously set forth herein; and (3) from about 1 to about 50 parts of the adhesion promoter of this invention.

Component (1) of the RTV composition of the present invention is a diorganopolysiloxane polymer terminated at each end of the polymer chain by at least two alkoxy radicals and having a viscosity varying from about 100 to about 1,000,000 centipoise at 25° C. and preferably from about 5000 to about 200,000 centipoise at 25° C. The organic group of the polymer is a $C_{1-15}$ monovalent hydrocarbon radical.

Such polyalkoxy-terminated diorganopolysiloxanes are known in the art and are disclosed, for example, in U.S. Pat. No. 4,863,992 (Wengrovius et al.), which has been previously been incorporated by reference herein.

Preferably, the polymer constituting component (1) has the general formula:

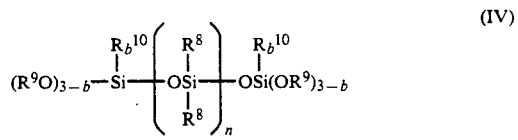

(IV)

wherein each $R^8$ and $R^{10}$ is independently a substituted or unsubstituted $C_{(1-15)}$ monovalent hydrocarbon radical, $R^9$ is a $C_{(1-8)}$ aliphatic organic radical selected from alkyl radicals, alkyl ether radicals, alkylester radicals, alkylketone radicals, alkylcyano radicals, or a $C_{(7-13)}$ aralkyl radicals; n is a whole number ranging from about 50 to about 2500, and b is a whole number which is either 0 or 1.

In formula (IV), $R^8$ is preferably selected from $C_{(1-15)}$ monovalent hydrocarbon radicals, halogenated hydrocarbon radicals, and cyano alkyl radicals; $R^9$ is preferably a $C_{(1-8)}$ alkyl radical or a $C_{(7-13)}$ aralkyl radical; and $R^{10}$ is preferably methyl, phenyl, or vinyl. Most preferably, $R^8$, $R^9$, and $R^{10}$ are each methyl.

The terminal silicon atom in the polymer of component (1) must have at least two alkoxy groups and can have as many as three alkoxy groups in accordance with the above description.

The polyalkoxy-terminated organopolysiloxane of formula (IV) can be made by various procedures. One procedure is taught by Cooper et al., U.S. Pat. No. 3,542,901, involving the use of a polyalkoxysilane with a silanol-terminated polydiorganosiloxane in the presence of an amine catalyst.

The polymer of formula (IV) is preferably produced according to the method described in U.S. Pat. No. 4,515,932 to Chung, which is hereby incorporated by reference herein. In the Chung method, the polymer is prepared by reacting a silanol terminated diorganopolysiloxane polymer having a viscosity in the range of 100 to 1,000,000 centipoise at 25° C. where the organic group is a monovalent hydrocarbon group with a polyalkoxy cross-linking agent of the formula

in the presence of an end-coupling catalyst where $R^9$, $R^{10}$ and "b" are as previously defined.

The end-coupling reaction wherein the polymer of formula (IV) is formed according to the Chung method is carried out by mixing the alkoxy silane with the silanol terminated diorganopolysiloxane polymer of polymers in the presence of an end-coupling catalyst selected from the class consisting of Bronsted acids, Lewis acids, stearic acid treated calcium carbonate, and amines and mixtures thereof. The amines can be either primary, secondary, or tertiary amines. The more basic the amine the better it is as a catalyst. The most preferred catalyst is one of the acids indicated above and most preferably is a combination of one of the acids with an amine. After end-coupling is complete, a silazane (for example, hexamethyldisilazane) is added to quench the amine salt catalyst, providing a shelf-stable polymer. For more information as to such catalysts and the end-coupling reactions one is referred to the disclosure of Chung, U.S. Pat. No. 4,515,932, which was previously incorporated by reference herein.

Component (2) of the RTV composition of this invention is a diorganotinbis-diketonate condensation catalyst of the general formula (I) previously set forth herein.

Radicals included within $R^4$ of formula (I) are, for example, $C_{(6-13)}$ aryl radicals and halogenated aryl radicals, such as phenyl, tolyl, chlorophenyl, naphthyl; $C_{(1-18)}$ aliphatic, cycloaliphatic radicals, and halogenated derivatives thereof, for example, cyclohexyl, cyclobutyl; alkyl and alkenyl radicals, such as methyl, ethyl, propyl, chloropropyl, butyl, pentyl, hexyl, heptyl, octyl, vinyl, allyl, and trifluoropropyl.

Some of the tin condensation catalysts included within formula (I) are, for example, di(n-butyl)tinbis(acetylacetonate); di(n-butyl)tinbis(benzoylacetonate); di(ethyl)tinbis(lauroylacetonate); di(methyl)tinbis(pivaloylacetonate); di(n-octyl)tinbis(acetylacetonate); di(n-propyl)tinbis(1,1,1-trifluoroacetylacetonate); di(n-butyl)tinbis(ethylacetoacetate); and di(n-butyl)tin(acetylacetonate)(ethylacetoacetate).

The preferred tin catalyst for use in the present invention is di(n-butyl)tinbis(acetylacetonate).

Effective amounts of the condensation catalyst to facilitate the cure of the RTV compositions are, for example, from about 0.01 to about 2.0, preferably from about 0.1 to about 1.0, and most preferably from about 0.2 to about 0.4, parts by weight per 100 parts of the alkoxy-functional polydiorganosiloxane (1).

Component (3) is the adhesion promoter of the present discussion. The adhesion promoter is present in the RTV composition of this invention in an amount in the range of from about 1 to about 50, preferably from about 5 to about 40, and most preferably from about 10 to about 30, parts by weight, per 100 parts of component (1).

In preferred embodiments, the RTV compositions of this invention further contains small amounts of (4) scavenger for hydroxy-functional groups.

The scavenger can be any scavenger that is known in the art. A scavenger in this application is defined as any compound having a functional group that will tie up and react with free hydroxy groups in the composition and bond with the hydroxy groups and prevent them from reacting with alkoxy groups in the composition. In this respect, the scavenger can be an integrated cross-linker, scavenger as will be explained below which contains alkoxy groups as well as scavenging groups.

Suitable scavenger compounds for use in the RTV compositions of the present invention are disclosed, for example, in U.S. Pat. Nos. 4,895,918 (Lucas); 4,417,042 (Dziark); 4,467,063 (Lockhart); 4,477,625 (Lockhart); 4,499,229 (Lockhart); 4,499,230 (Lockhart); 4,395,526 (White et al.); and 4,472,551 (White et al.), all of which are incorporated by reference herein.

The preferred scavenger for use in the RTV compositions of this invention are the silicon-nitrogen compounds disclosed in U.S. Pat. No. 4,417,042 (Dziark), examples of which include the silazanes and hydrogen-containing amines.

The preferred silicon-nitrogen scavenger compounds for use in this invention are the disilazanes and the polysilazanes. Examples of suitable silazanes include hexamethylcyclotrisilazane, octamethyltetrasilazane, trimethyltriphenylcyclotrisilazane, and trivinyltrimethylcyclotrisilazane, and the like. The most preferred polysilazane for use in this invention is hexamethylcyclo-N-methyltrisilazane and the most preferred disilazane is hexamethyldisilazane.

The scavenger is present in the composition of this invention in an amount within the range of from about 0.1 to about 10, preferably from about 0.1 to about 1.0, more preferably about 0.2 to about 0.8, and most preferably from about 0.5 to about 0.7, parts per 100 parts of the polyalkoxy-terminated polydiorganosiloxane (1).

Adhesion promotion is frequently optimized if the adhesion promoter (3) is used in combination with (5) a cyanoalkyltrialkoxysilane, most often 2-cyanoethyltrimethoxysilane (hereinafter "CETMS") or 3-cyanopropyltrimethoxysilane, which acts as a synergist therefor. When used, component (5) is usually present in the amount of from about 0.1 to about 5.0, preferably from about 0.3 to about 2, and most preferably from about 0.5 to about 1, parts by weight per 100 parts of component (1).

The RTV compositions of this invention may further contain other constituents in common use in such compositions, including plasticizers, pigments, and fillers.

Preferably, the RTV composition of this invention further contains at least one filler (Component (6)). Various fillers can be incorporated into the composition of the present invention such as, for example, titanium dioxide, zirconium silicate, silica aerogel, iron oxide, diatomaceous earth, fumed silica, carbon black, precipitated silica, glass fibers, polyvinyl chloride, ground quartz, calcium carbonate, and the like. The preferred filler for use in the composition of this invention is reinforcing filler and most preferably fumed silica filler.

The amount of filler used can vary within wide limits in accordance with the intended use. For example, in some sealant applications, the curable compositions of the present invention can be used free of filler. In other applications, such as employment of the curable compositions for making binding material, as much as 700 parts or more of filler per 100 parts by weight of the alkoxy-terminated polydiorganosiloxane (1).

The compositions of the present invention also can be used as construction sealants and caulking compounds. The exact amount of filler, therefore, will depend upon such factors as the application for which the composition is intended and the type of filler used. Preferably, from about 5 to about 100 parts of filler, which can include up to about 40 parts, and preferably from about 5 to about 40 parts, of reinforcing filler, such as fumed silica filler, per 100 parts of organopolysiloxane (1) is used.

It is frequently advantageous to pretreat a silica filler with an activating agent such as octamethylcyclotetrasiloxane.

In preferred embodiments, the RTV compositions of this invention further contain a beta-diketone (component (7)) capable of chelating with the tin condensation catalyst of formula (I). The beta-diketone, hereinafter referred to as "the chelating ligand", has been found to impart improved shelf stability to the RTV composition when used in effective amounts. Suitable beta-diketones for use in this invention are disclosed, for example, in U.S. Pat. No. 4,863,992 (Wengrovius et al.) which has previously been incorporated by reference herein.

From a cost and availability standpoint, the preferred chelating ligand is 2,4-pentanedione. However, the Environmental Protection Agency has recently issued a Significant New Use Rule (SNUR) covering 2,4-pentanedione which labels it a potential neurotoxin, mutagen, and developmentally toxic by inhalation. The SNUR essentially prohibits the use of 2,4-pentanedione in any new consumer product, thus greatly restricting the marketability of RTV sealants containing it. Other, relatively non-toxic beta-diketones can be used in place of 2,4-pentanedione. Examples of these include 2,2,6,6-tetramethyl-3,5-heptanedione, 1,1,1-trifluoro-2,4-pentanedione, 1-phenyl-1,3-butanedione, 2,4-hexanedione, and 5,7-nonanedione. The most preferred of these non-toxic beta-diketones is 2,4-hexanedione.

The chelating ligand can be present in the RTV compositions of this invention in an amount within the range of from about 0.01 to about 10, preferably from about 0.01 to about 5, more preferably from about 0.2 to about 0.8, and most preferably from about 0.3 to about 0.5, part by weight per 100 parts of the alkoxy-functional polydiorganosiloxane (1).

The RTV composition of this invention can further contain from a polyalkoxysilane crosslinking agent (Component (8)) of the general formula (V) previously set forth herein.

Illustrative polyalkoxysilane crosslinking agents include methyltrimethoxysilane, methyltriethoxysilane, ethyltrimethoxysilane, tetraethoxysilane, and vinyltrimethoxysilane. Methyltrimethoxysilane is preferred.

The polyalkoxy crosslinking agent is typically present in the RTV compositions of this invention in an amount within the range of from about 0.01 to about 20, preferably from about 0.1 to about 2, and most preferably from about 0.5 to about 1.0, parts by weight per 100 parts of the alkoxy-functional polydiorganosiloxane (1).

The composition of the present invention may further contain from about 1 to about 50 parts by weight of a triorganosilyl-endstopped diorganopolysiloxane (9) having a viscosity of from 10 to 5000 centipoise at 25° C., where the organo groups are monovalent hydrocarbon radicals, preferably of from 1 to 8 carbon atoms. Such linear diorganopolysiloxane polymers are useful as plasticizers. Preferably, such plasticizers are free of silanol groups but usually there is present up to about 500 ppm of silanol groups. It is also preferable that the organo substituent groups are methyl and that the viscosity range from 10 to 1000 centipoise at 25° C.

Thus, in its most preferred embodiment, the RTV silicone composition of this invention contains, in addition to components (1)–(3), components (4)–(9).

Other compounds, for example, flame retardants such as platinum, may also be included in the composition of the present invention.

The RTV compositions of the present invention may be prepared by methods known in the art. For example, they may be prepared by mixing all the ingredients together at the same time. Preferably, they are prepared by rigorously blending a mixture of the polyalkoxy-terminated polymer, the cyano-functional polyalkoxy silane, and filler. Afterwards, the crosslinker, tin catalyst, stabilizer/scavenger, adhesion promoter, and other ingredients, e.g., plasticizer, are added separately or together, followed by thorough mixing under anhydrous conditions.

The RTV compositions may be coated on a variety of substrates, particularly masonry substrates. Examples of suitable substrates include aluminum, glass, polyacrylate, polycarbonate, polyvinylchloride, polyphenylene oxide, polyamide, steel, acrylonitrile-butadiene-styrene copolymer, nylon, and concrete.

The Examples given below are provided for the purpose of illustrating the present invention. They are not given for any purpose of setting limits or boundaries to the instant invention. All parts and/or percentages in the Examples are by weight.

EXPERIMENTAL

In the examples below, the following terms have the meanings given below:

"MDT Fluid"—refers to a silanol fluid having a viscosity of about 15 centipoise at 25° C., a silanol content of about 0.5% by weight, and containing monomethylsiloxy, siloxy units or a mixture of such units; trimethylsiloxy units, and dimethylsiloxy units, the silanol fluid being prepared by co-hydrolyzing a blend comprising by weight 2.29% of trimethylchlorosilane, 75.20% of dimethyldichlorosilane, and 22.52% of methyltrichlorosilane.

"$D^4$"—refers to octamethylcyclotetrasiloxane

"ABS"—refers to acrylonitrile-butadiene-styrene copolymer

"PVC"—refers to polyvinylchloride
"% C.F."—refers to percent cohesive failure

EXAMPLE 1

Example 1 illustrates the preparation of an adhesion promoter within the scope of this invention.

1100 g of MDT Fluid and 1100 g of $D_4$ were heated to 105° C. under a nitrogen atmosphere. 116 g of tris(3-trimethoxysilylpropyl) isocyanurate along with 0.8 g $iBu_2NH$ and 0.4 g formic acid (condensation catalyst) were then added to the heated silanol fluid. After 3 hours at this temperature, the reaction was complete, as indicated by $^{29}Si$ NMR which showed complete consumption of SiOH groups on the MDT Fluid and concurrent appearance of new Si groups bound to the polymer chain.

EXAMPLE 2

Example 2 illustrates the preparation and properties of an RTV silicone composition containing the adhesion promoter of this invention.

An RTV composition containing the ingredients below was prepared by blending the ingredients and mixing them using an extruder:
- 100 parts (by weight) $CH_3(CH_3O)_2Si$-endcapped polydimethylsilicone polymer having a viscosity of 130,000 centipoise at 25° C.
- 1.5 parts cyanoethyltrimethoxysilane
- 15 parts $D_4$-treated fumed silica
- 15 parts $(CH_3)_2(OCH_3)Si$-endcapped plasticizing fluid
- 20 parts of the reaction product of Example 1
- 1.5 parts $CH_3Si(OCH_3)_3$
- 0.45 parts $Bu_2Sn(2,4\text{-pentanedionate})_2$
- 0.45 parts 2,4-pentanedione The RTV prepared in Example 2 had the following physical properties:
tack free time=35 minutes
properties after 7 day cure:
  Shore A=12
  Elongation at break=604%
  Tensile at break=170 psi
  Modulus at 50/100/150% elongation=28/37/46
7 day propertries after heating uncured RTV for 24 hours at 100° C.
  Shore A=10
  Elongation at break=604%
  Tensile at break=179 psi
  Modulus at 50/100/150% elongation=28/37/46

The 180° dry peel adhesion properties after a 14 day cure of the RTV composition prepared in Example 2 were measured and are recorded in Table 1 below. The 180° cohesive failure properties after a 14 day cure followed by a 7 day water soak of the RTV composition prepared in Example 2 were measured and are also presented in Table 1 below.

TABLE 1

| Dry Peel Adhesion and Cohesive Failure Properties: Example 2 | | |
| --- | --- | --- |
| Substrate | Dry Peel Adhesion (psi/% C.F.) | Cohesive Failure (psi/% C.F.) |
| Glass | 30/100 | 20/100 |
| Anodized Aluminum | 26/100 | 17/100 |
| Mill Finished Aluminum | 27/100 | 27/100 |
| Duranar | 31/100 | 24/100 |
| Primed Mortar | 17/100 | 0/0 |
| Galvinized Steel | 24/100 | 25/100 |
| PVC | 28/100 | 26/100 |
| ABS | 24/100 | 18/100 |

TABLE 1-continued

| Dry Peel Adhesion and Cohesive Failure Properties: Example 2 | | |
| --- | --- | --- |
| Substrate | Dry Peel Adhesion (psi/% C.F.) | Cohesive Failure (psi/% C.F.) |
| Polyphenylene Oxide | 26/50 | 24/50 |
| Polyacrylate | 0/0 | 25/100 |
| Polyamide | 23/100 | 31/100 |

EXAMPLE 3

An RTV composition identical to the formulation of Example 2 was prepared, except that the reaction product of Example 1 was omitted and 20 parts of MDT Fluid was substituted therefor.

The 180° dry peel adhesion properties after a 14 day cure of the RTV composition prepared in Example 3 were measured and are recorded in Table 2 below. The 180° cohesive failure properties after a 14 day cure followed by a 7 day water soak of the RTV composition prepared in Example 3 were measured and are also presented in Table 2 below.

TABLE 2

| Dry Peel Adhesion and Cohesive Failure Properties: Example 3 | | |
| --- | --- | --- |
| Substrate | Dry Peel Adhesion (psi/% C.F.) | Cohesive Failure (psi/% C.F.) |
| Glass | 15/0 | 0/0 |
| Anodized Aluminum | 0/0 | 0/0 |
| Mill Finished Aluminum | 0/0 | 0/0 |
| Fluorocarbon-painted Steel | 0/0 | 0/0 |
| Primed Mortar | 0/0 | 0/0 |
| Galvinized Steel | 0/0 | 0/0 |
| PVC | 20/50 | 0/0 |
| ABS | 25/100 | 0/0 |
| Polyphenylene Oxide | 0/0 | 0/0 |
| Polyacrylate | 0/0 | 0/0 |
| Polyamide | 0/0 | 0/0 |

EXAMPLE 4

An RTV silicone composition having the formulation below was prepared using an extruder:
- $CH_3(CH_3O)_2Si$-endcapped polydimethylsiloxane having a viscosity of 130,000 centipoises at 25° C.—100 parts by weight
- $D_4$-treated fumed silica—16 parts by weight
- linear polydimethylsiloxane having a viscosity of about 100 centipoise at 25° C.—20 parts by weight
- MDT Fluid—10 parts by weight
- $CH_3Si(OCH_3)_3$—0.75 parts by weight
- 1,3,5-tris(3-trimethoxysilylpropyl)isocyanurate—1.0 part by weight
- $Bu_2Sn(2,4\text{-pentanedionate})_2$—0.4 part by weight
- 2,4-pentanedione—0.3 part by weight

EXAMPLE 5 (COMPARATIVE)

Example 4 was repeated except that the MDT Fluid was omitted and 110 parts by weight of $CH_3(CH_3O)_2Si$-endcapped polydimethylsiloxane were used instead of 100 parts by weight.

The 180° peel dry adhesion properties after a 14 day cure of the RTV compositions prepared in Examples 4 and 5 were measured and are recorded in Table 3 below.

TABLE 3

Dry Peel Adhesion Properties: Examples 4 and 5

| Substrate | Example 4 Dry Peel Adhesion (ppi/% C.F.) | Example 5 Dry Peel Adhesion (ppi/% C.F.) |
|---|---|---|
| Glass | 36/100 | 27/100 |
| Alclad Aluminum | 34/100 | 35/100 |
| Anodized Aluminum | 32/100 | 9/0 |
| Fluorocarbon-painted Steel | 27/100 | 28/100 |
| Polyvinyl-chloride | 32/100 | 22/90 |
| Concrete | 37/100 | 16/10 |

The 180° wet peel adhesion properties after a 7 day water soak of the RTV compositions prepared in Examples 4 and 5 were measured and are recorded in Table 4 below.

TABLE 4

Wet Peel Adhesion Properties: Examples 4 and 5

| Substrate | Example 4 Wet Peel Adhesion (ppi/% C.F.) | Example 5 Wet Peel Adhesion (ppi/% C.F.) |
|---|---|---|
| Glass | 26/100 | 35/100 |
| Alclad Aluminum | 30/100 | 28/100 |
| Anodized Aluminum | 22/100 | 0/0 |
| Fluorocarbon-painted Steel | 21/100 | 12/0 |
| Polyvinyl-chloride | 24/100 | 29/90 |
| Concrete | 40/50 | 15/0 |

EXAMPLE 6 (COMPARATIVE)

An RTV silicone composition having the formulation below was prepared using an extruder:
$CH_3(CH_3O)_2Si$-endcapped polydimethylsiloxane having a viscosity of 130,000 centipoises at 25° C.—100 parts by weight
$D_4$-treated fumed silica—16 parts by weight
linear polydimethylsiloxane having a viscosity of about 100 centipoise at 25° C.—20 parts by weight
MDT Fluid—10 parts by weight
$CH_3Si(OCH_3)_3$—0.75 parts by weight
1,3,5-tris(3-trimethoxysilylpropyl)isocyanurate—1.0 part by weight
$Bu_2Sn(2,4$-pentanedionate$)_2$—0.4 part by weight
2,4-pentanedione—0.3 part by weight
$CH_3Si(OCH_3)_3$—0.75 part by weight
Hexamethyldisilazane—1.0 part by weight
Cyanoethyltrimethoxysilane—1.0 part by weight

EXAMPLE 7

Example 6 was repeated except that the MDT Fluid and the 1,3,5-tris(3-trimethoxysilylpropyl)isocyanurate were omitted and 1.1 parts by weight of a product prepared according to the method of Example 1 were added.

The 180° wet peel adhesion properties after a 14 day cure followed by a 7 day water soak of the RTV compositions prepared in Examples 6 and 7 were measured and are presented in Table 5 below.

TABLE 5

Wet Peel Adhesion Properties: Examples 6 and 7

| Substrate | Example 6 Wet Peel Adhesion (ppi/% C.F.) | Example 7 Wet Peel Adhesion (ppi/% C.F.) |
|---|---|---|
| Glass | 20/100 | 27/100 |
| Anodized Aluminum | 25/100 | 26/100 |
| Mill Finished Aluminum | 21/75 | 23/100 |
| Fluorocarbon-painted Steel | 26/100 | 26/100 |
| Concrete | 0/0 | 20/100 |
| Polyvinylchloride | 25/100 | 31/100 |
| ABS | 27/100 | 30/100 |
| Polyphenylene Oxide | 29/100 | 28/100 |
| Polyacrylate | 0/0 | 23/100 |
| Polyamide | 29/100 | 33/100 |
| Polycarbonate | 0/0 | 21/100 |

The examples demonstrate the utility of the adhesion promoter used in the present invention and also demonstrate the excellent overall physical properties of the RTV compositions of this invention.

What is claimed is:

1. An alkoxy-functional RTV organopolysiloxane composition comprising by weight:
   (1) 100 parts of a polyalkoxy-terminated polydiorganosiloxane having a viscosity of from about 100 to about 1,000,000 centipoise at 25° C., wherein the silicon atoms at each polymer chain end is terminated with at least two alkoxy radicals, the organic group being a $C_{1-15}$ monovalent hydrocarbon radical;
   (2) an effective amount of a diorganotin bis beta-diketonate condensation catalyst of the general formula:

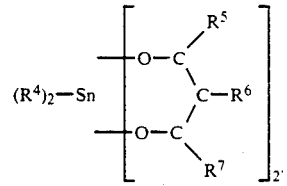

wherein $R^4$ is selected from $C_{(1-18)}$ monovalent hydrocarbon radicals and substituted monovalent hydrocarbon radicals, and $R^5$, $R^6$, and $R^7$ are the same or different monovalent radicals selected from the class consisting of hydrogen, $R^4$, $OR^4$, $-Si(R^4)_3$, $-OSi(R^4)_3$, aryl, acyl, and nitrile; and
   (3) from about 1.0 to about 50 parts of an adhesion promoter which is the product prepared by reacting at a temperature in the range of from about 10° to about 150° C.:
   (A) 100 parts by weight of a silanol-containing polysiloxane selected from
      (i) a linear, silanol-terminated polydiorganosiloxane having the general formula:

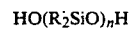

wherein each R is independently a monovalent hydrocarbon radical having from 1 to about 10 carbon atoms, and "n" is a whole number that varies from about 2 to about 1000; or
      (ii) a silanol-containing polysiloxane fluid comprising:

(a) from about 1 to about 80 mole percent of monoorganosiloxy units;

(b) from about 0.5 to about 50 mole percent of triorganosiloxy units;

(c) from about 1 to about 80 mole percent of diorganosiloxy units; and (d) from 0 to about 25 mole percent of siloxy units;

the silanol-containing polysiloxane containing from about 0.01 to about 7% by weight of silicon-bonded hydroxyl groups; and (B) from about 0.1 to about 10 parts by weight of at least one organofunctional-polyalkoxysilane having the general formula

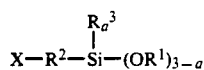

$$X-R^2-\underset{\underset{R_a^3}{|}}{Si}-(OR^1)_{3-a}$$

wherein each $R^1$ and $R^3$ is independently a monovalent hydrocarbon radical having from 1 to about 20 carbon atoms; each $R^2$ is independently a divalent saturated, unsaturated, or aromatic hydrocarbon radical having from 1 to about 20 carbon atoms; X is a polar organic radical selected from the group consisting of amido, formamido, imidato, ureas, isocyanato, cyano, acryloxy, acyloxy, ether, and epoxy, and "a" is a number from 0 to 2.

2. A composition according to claim 1 wherein (A) is the silanol-containing polysiloxane fluid (A)(ii).

3. A composition according to claim 1 wherein the silanol-containing polysiloxane fluid (A)(ii) comprises (a) from about 10 to about 70 mole percent of monoorganosiloxy units;

(b) from about 5 to about 40 mole percent of triorganosiloxy units;

(c) from about 10 to about 70 mole percent of diorganosiloxy units; and (d) from 0 to about 5 mole percent of siloxy units.

4. A composition according to claim 3 wherein the silanol-containing polysiloxane fluid (A)(ii) comprises (a) from about 20 to about 60 mole percent of monoorganosiloxy units;

(b) from about 10 to about 30 mole percent of triorganosiloxy units;

(c) from about 20 to about 60 mole percent of diorganosiloxy units; and (d) 0 mole percent of siloxy units.

5. A composition according to claim 2 wherein the silanol-containing polysiloxane fluid (A)(ii) has viscosity in the range of 10 to 10,000 centipoise at 25° C.

6. A composition according to claim 1 wherein (B) is a polyalkoxysilylalkyl isocyanurate, a polyalkoxysilylalkyl epoxide, or a combination of the foregoing.

7. A composition according to claim 6 wherein (B) is a trialkoxysilylalkyl isocyanurate, a trialkoxysilylalkyl epoxide, or a combination of the foregoing.

8. A composition according to claim 7 wherein (B) is 1,3,5-tris(trimethoxysilylpropyl)isocyanurate, gamma-glycidoxypropyltrimethoxysilane, or a combination of the foregoing.

9. A composition according to claim 1 wherein the adhesion promoter (3) is present in an amount within the range of from about 5 to about 40 parts by weight.

10. A composition according to claim 9 wherein the adhesion promoter (3) is present in an amount within the range of from about 10 to about 30 parts by weight.

11. A composition according to claim 1 further comprising from about 0.1 to about 10 parts by weight, per 100 parts of (1), of a scavenger compound (4) for hydroxyl groups.

12. A composition according to claim 11 wherein the scavenger compound is a disilazane or a polysilazane.

13. A composition according to claim 1 further comprising at least one of the following, all proportions being per 100 parts of component (1):

(5) from about 0.1 to about 5 parts of a cyanoalkyltrialkoxysilane;

(6) from about 5 to about 100 parts of at least one filler;

(7) from about 0.01 to about 5 parts of a beta-diketone;

(8) from about 0.01 to about 20 parts of a polyalkoxysilane crosslinking agent of the general formula:

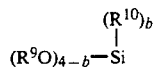

$$(R^9O)_{4-b}-\underset{\underset{(R^{10})_b}{|}}{Si}$$

wherein $R^9$ is a $C_{(1-8)}$ aliphatic organic radical selected from alkyl radicals, alkyl ether radicals, alkylester radicals, alkylketone radicals, alkylcyano radicals, or a $C_{(7-13)}$ aralkyl radical; $R^{10}$ is independently a substituted or unsubstituted $C_{(1-15)}$ monovalent hydrocarbon radical, and b is a whole number which is either 0 or 1; and (9) from about 1 to about 50 parts of a triorganosilyl-endstopped polydiorganosiloxane as plasticizer.

14. A composition according to claim 13 further comprising from about 0.1 to about 10 parts by weight, per 100 parts of (1), of a scavenger compound (4) for hydroxyl groups.

15. A method for improving the adhesion of an RTV composition to a substrate, comprising the step of combining (a) an alkoxy-functional RTV organopolysiloxane composition comprising by weight:

(1) 100 parts of a polyalkoxy-terminated polydiorganosiloxane having a viscosity of from about 100 to about 1,000,000 centipoise at 25° C., wherein the silicon atoms at each polymer chain end is termined with at least two alkoxy radicals, the organic group being a $C_{1-15}$ monovalent hydrocarbon radical; and (2) an effective amount of a diorganotin bis beta-diketonate condensation catalyst of the general formula:

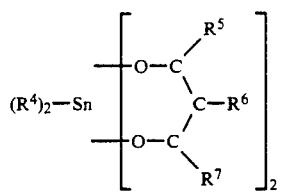

wherein $R^4$ is selected from $C_{(1-18)}$ monovalent hydrocarbon radicals and substituted monovalent hydrocarbon radicals, and $R^5$, $R^6$, and $R^7$ are the same or different monovalent radicals selected from the class consisting of hydrogen, $R^4$, $OR^4$, $-Si(R^4)_3$, $-OSi(R^4)_3$, aryl, acyl, and nitrile; with (b) from about 1 to about 50 parts of an adhesion promoter which is the product prepared by reacting at a temperature in the range of from about 10° to about 150° C.:

(A) 100 parts by weight of a silanol-containing polysiloxane selected from
   (i) a linear, silanol-terminated polydiorganosiloxane having the general formula:

$HO(R_2SiO)_nH$ wherein each R is independently a monovalent hydrocarbon radical having from 1 to about 20 carbon atoms, and "n" is a whole number that varies from about 2 to about 1000; or
   (ii) a silanol-containing polysiloxane fluid comprising:
      (a) from about 1 to about 80 mole percent of monoorganosiloxy units;
      (b) from about 0.5 to about 50 mole percent of triorganosiloxy units;
      (c) from about 1 to about 80 mole percent of diorganosiloxy units; and
      (d) from 0 to about 25 mole percent of siloxy units;

the silanol-containing polysiloxane containing from about 0.01% to about 7% by weight of silicon-bonded hydroxyl groups; and (B) from about 0.1 to about 10 parts by weight of at least one organofunctional-polyalkoxysilane having the general formula $$X-R^2-\underset{\underset{R_a^3}{|}}{Si}-(OR^1)_{3-a}$$

wherein each $R^1$ and $R^3$ is independently a monovalent hydrocarbon radical having from 1 to about 20 carbon atoms; each $R^2$ is independently a divalent saturated, unsaturated, or aromatic hydrocarbon radical having from 1 to about 20 carbon atoms; X is a polar organic radical selected from the group consisting of amido, formamido, imidato, ureas, isocyanato, cyano, acryloxy, acyloxy, ether, and epoxy, and "a" is a number from 0 to 2.

16. An article comprising a substrate coated with the RTV composition of claim 1.

17. An article according to claim 16 wherein the RTV composition of claim 1 is in a cured state.

* * * * *